Oct. 27, 1925.
J. S. ADAMS
HEADLIGHT
Filed Jan. 21, 1924
1,558,570
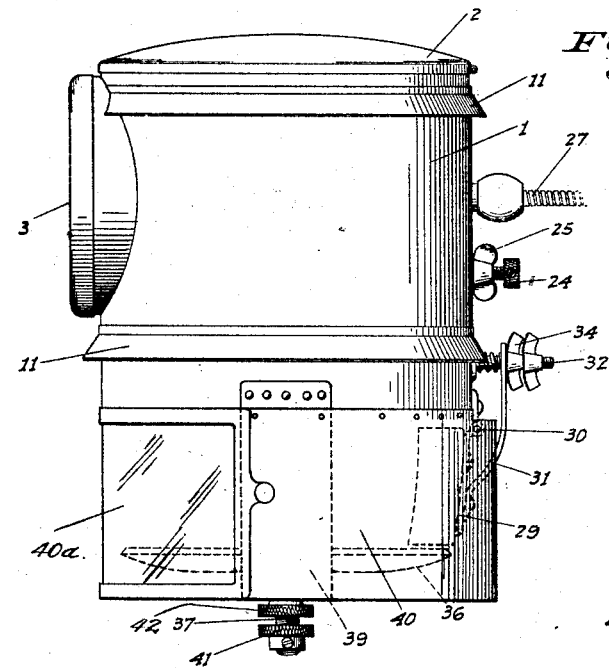
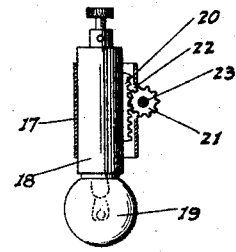
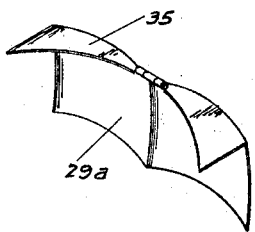
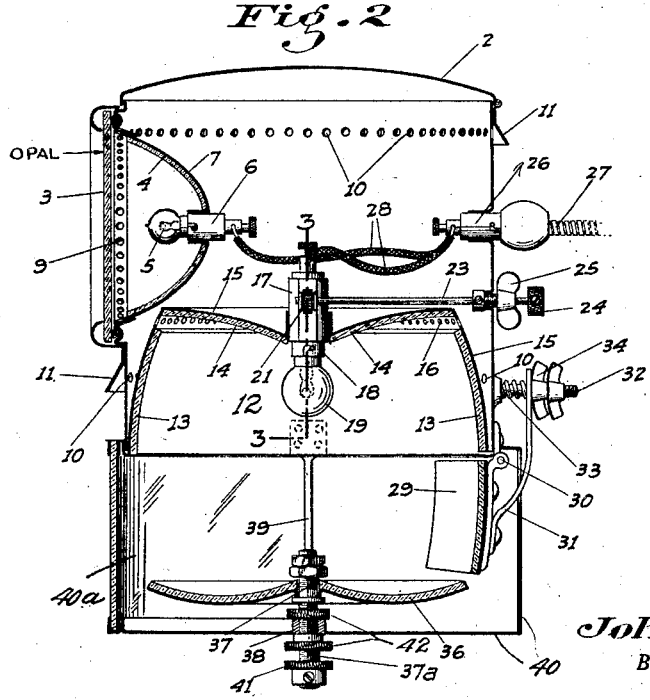
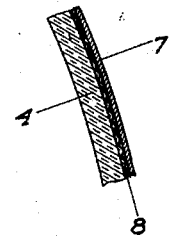
INVENTOR.
John S. Adams
BY
ATTORNEY Patented Oct. 27, 1925.

1,558,570

UNITED STATES PATENT OFFICE.

JOHN S. ADAMS, OF POMONA, CALIFORNIA.

HEADLIGHT.

Application filed January 21, 1924. Serial No. 687,443.

*To all whom it may concern:*

Be it known that I, JOHN S. ADAMS, a citizen of the United States, residing at Pomona, county of Los Angeles, State of California, have invented certain new and useful Improvements in Headlights; and I do declare the following to be a full, clear, and exact description of the same, reference being had to the accompanying drawings, and to the characters of reference marked thereon, which form a part of this application.

This invention relates to improvements in headlights for motor vehicles, and is particularly intended as an improvement over the type of headlight shown in my copending application for patent on "headlight mounting and construction", filed September 20th, 1923, Serial No. 663,752.

This previous headlight was designed to throw the road illuminating light directly down instead of ahead, thus eliminating the possibility of the light striking the eyes of a person ahead of the car on which my headlight is mounted—a source of annoyance and danger had in varying degrees with all forms of headlights now used.

I found however that a good percentage of the downwardly reflected light was going to waste, since it was thrown to the rear of the headlights where it served no useful purpose.

The principal object of the present invention therefore is to provide a headlight of the above mentioned general type, with additional reflecting means arranged to catch the rearwardly directed rays of light and throw them downwardly in a forward direction.

Another object is to make this additional reflecting means readily adjustable, so that the horizontal angle of the rays thrown forward therefrom may be altered at will.

I have also provided a main or fixed reflector of novel form, designed to spread the light in the most efficient manner.

A further object is to provide a novel and easily operated means for adjusting the light bulb relative to the main reflector.

Polished opal granite steel and glass mirrors, being the most efficient reflectors, I intend to use the same in my headlight, and to prevent the glass from being broken by the heat generated by the lamp bulbs, and gasoline mantle burners, I have arranged for a thorough ventilation and cooling of the reflectors on both sides of the same, so that the heat will be dissipated and prevented from attaining a degree sufficient to break the glass.

The glass reflectors are backed by a cushioning and shock absorbing material, and as the headlight as a whole is preferably supported on springs in any of the various ways shown in the aforementioned copending application, the danger of breaking the glass from car vibrations or road shocks is practically eliminated.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved headlight.

Fig. 2 is a sectional elevation of the same.

Fig. 3 is a fragmentary section on the line 3—3 of Fig. 2.

Fig. 4 is a detached perspective view of the supporting casing of a modified form of auxiliary reflector.

Fig. 5 is an enlarged fragmentary section of a glass reflector.

Referring now more particularly to the characters of reference on the drawings, the numeral 1 denotes the main casing of the headlight, preferably of cylindrical form with its axis in a vertical plane. This casing is open on the bottom, but on top is a cover 2, hinged at its rear edge, so that it may be raised when necessary, as for instance to connect up or inspect the bulb connections and wiring.

The front of the casing has an orifice of suitable size, covered by a pane of opal or translucent glass 3, behind which is a parabolic glass or polished opal granite steel reflector 4 of ordinary shape, a bulb 5 being mounted in this reflector centrally thereof and with its axis in a horizontal plane. The terminal member 6 for this bulb projects into the casing back of the reflector. The bulb 5 is of lower candle power, since its purpose, and that of the lens 3, is merely to give a signal light.

The reflector 4 is backed by a sheet metal holder 7 of similar shape, a layer of felt 8 or similar material being placed between the metal and the glass to provide a cushion and shock absorbing seat for the latter.

The holder 7 extends to the lens 3, and between said lens and the reflector 4 the holder is perforated at spaced intervals as at 9, communication being thus established between the interior of the reflector and the interior of the casing. A circulation of air through the latter is had by reason of vertically spaced and peripherally disposed rows of holes 10 in the casing, hoods 11 being secured to the casing above said rows and flaring thence outwardly and downwardly. Thus while air can freely enter the casing through the orifices, no descending dust or moisture, or a driving rain, can pass through said orifices.

Fixed in the bottom of the casing and projecting upwardly therefrom is the main and downwardly facing main reflector indicated generally at 12. This reflector is preferably of glass, and made in two parts, 13 and 14.

The lower and substantially vertical part 13 fits the casing at its lower end, and slopes inwardly therefrom to its upper end, the edge of which lies in a horizontal plane. The surface of the member 13 having a curvature of predetermined radius, it may be considered as being the frustum of a hollow hemisphere. The member 14 is substantially disc shaped, having a downward and convexly curved dish toward its central orifice, as shown. The diameter of this member is substantially the same as that of the member 13 at the upper end of the latter, and it is spaced somewhat above the same.

The members 13 and 14 are mounted in a common metal holder 15, the contour of which conforms to that of said members, there being a layer of the felt 8 between the glass and metal as is the case with the reflector 4. The holder 15 is orificed in the space between the members 13 and 14, as shown at 16, for the purpose of ventilating the interior of the reflector.

A metal sleeve 17 is fixed to the member 15 and extends upwardly therefrom in alinement with the central reflector-orifice. In this sleeve is slidable mounted a socket member 18 for the bulb 19, of suitably high candle power, which projects below the member 14. The socket member has mounted thereon a vertically disposed rack 20 engaged by a pinion 21 journaled on the outside of the sleeve 17 and meshing with the rack through an orifice 22 cut in said sleeve.

The shaft 23 of the pinion extends through the rear end of the casing, being also journaled therein, said shaft outside the casing having a knob 24 or other member whereby it may be turned, and a hand-operated locknut 25 to hold it in any desired position. The setting of the bulb 19 relative to the reflector may thus be easily regulated to obtain the best results, without having to remove a lens.

The plug member 26 for the main current cable 27 is mounted in the back of the casing above the reflector 12 and projects a certain distance into the casing as usual.

Owing to the fact that the interior of the casing is readily accessible by raising up the cover 2, it is an easy matter to connect the leads 28 to the main and secondary lamp terminals.

The light rays caught by the side reflecting member 13 are thrown downwardly and at an angle to a vertical line, as will be evident.

The rearwardly extending ones of these rays are of course of no value, as far as giving light for driving purposes is concerned, unless deflected so as to be thrown forward and ahead of the lamp.

In order to accomplish this object, I mount an auxiliary vertical reflector 29, facing forwardly, at the back of and below the main reflector 12. This reflector catches the rays from the forward end of the member 13 and deflects them ahead and downwardly.

This reflector, like the others, is of glass, backed by metal and with felt therebetween. The auxiliary reflector is hinged at its upper edge as at 30 in a horizontal plane with its axis extending transversely of the lamp.

The vertical angle of setting of this reflector may be changed at will by means of a rigid vertical arm 31 fixed to the reflector below its hinge line and extending upwardly beyond the same a suitable distance rearwardly thereof. A stud 32 fixed on the casing projects through the arm 31 near its upper end, said stud having a spring 33 pressing the arm to the rear, and adjustable nuts 34 bearing on the arm and resisting the action of the spring.

The auxiliary reflector may be of the shape shown in Fig. 1, which is substantially the segment of a short cylinder of suitable vertical curvature and desired arcuate extent, and having the same radius as the reflector, 13. Or it may be made in the shape shown at 29ª in Fig. 4, this constituting a pair of flat cylindrical segments abutting at adjacent ends, forming a vertical apex under the hinge and lying adjacent the edge of the casing, and flaring outwardly from the casing from said apex to their outer ends. In order to prevent any light from passing upwardly between the lamp casing and the auxiliary reflector of the latter type, a hood 35 is secured thereto along the upper edge, which extends to the casing.

In connection with the reflectors 13, 14, and 29, I provide additional reflecting means in the form of a horizontal and upwardly facing and circular disc-like reflector 36, having a circumferential dish or convexity between its center and outer periphery.

This reflector is located below the reflector 29, in vertical concentric alinement with the reflectors 13 and 14.

It is centrally fixed on a sleeve 37 in which is fixed against longitudinal movement a post 37ª threaded through a cross arm 38 under the reflector, said cross arm being supported from the casing 1 by means of vertical hangers 39 secured to the sides of the casing. That hanger 39 which is on the engine or hood side of the headlight is much wider than the outer one, as will be evident from a comparison of these parts in Figs. 1 and 2.

The post 37ª at its lower end and below the crossbar 38, has a knob 41 whereby said post may be turned. Since the post is threaded through the fixed bar 38, on turning said post both it and the reflector 36 mounted in connection therewith, will be raised or lowered. Locknuts 42 on the post on both sides of the cross bar serve to lock the post in any position to which it may be moved.

By means of the above described arrangement of reflectors, no light can be thrown straight down from the casing where it is neither needed nor wanted.

Certain of the rays reflected from the reflector 13 are thrown directly down onto the ground at an acute angle, while others are caught by the rear reflector 29 and by the latter thrown onto the ground, said reflector 29 intercepting and reflecting forward, all rays which would otherwise extend rearwardly of the headlight.

The curvature of the reflector 36 is to be such that any rays caught thereby, either from the other reflectors or from the light bulb itself, will be reflected back against said other reflectors, while these in turn will throw the intensified light thus had ahead of and to the sides of the car, but at a downward and acute angle to the ground.

Both the reflectors 29 and 36 being independently adjustable, I feel that with proper design of the reflectors in their manufacture, and proper adjustment of the same in service, that a very efficient, nonglaring, and yet strong driving light will be obtained.

In order to protect the lower reflectors 29 and 36 as well as the parts thereabove from the elements, I mount a cylindrical casing 40, closed on the bottom, all about the lower edge of the main casing 1, the bottom of this casing extending just under the cross arm 38. The side portion extending between and to the rear of the hangers 39 is opaque, but the front portion is cut away and is covered by a translucent door 40ª. The rear portion being opaque, prevents any light passing laterally to the rear of the inner hanger 39 and striking on the adjacent fender of the vehicle.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a headlight, a fixed reflector arranged to throw light rays out at diverging angles to the axis of the reflector, an auxiliary reflector projecting outwardly of the fixed reflector and extending about the latter for a portion of the periphery thereof, a third reflector mounted outwardly of the auxiliary reflector and facing the fixed reflector, means for adjusting the spacing of the third reflector relative to the fixed reflector, and means for adjusting the angle of setting of the auxiliary reflector relative to the other reflectors.

2. In a headlight, a fixed reflector comprising a portion formed substantially as the frustum of a hollow hemisphere, and a disc like portion at the small end of the first portion curving inwardly toward its axis; a light bulb mounted centrally of said disc like portion, another reflector positioned opposite to and facing the fixed reflector in axial alinement therewith but in spaced relation thereto, and of substantially the same diameter as the outer end of the fixed reflector, said other reflector having a circumferential dish between its axis and outer periphery, and an auxiliary reflector mounted between the first named reflectors and being substantially formed as a continuation of a portion of the periphery of the first named portion of the fixed reflector.

3. In a headlight, a fixed reflector having a circular rim, means for supporting a source of light centrally of said reflector at the back thereof, said reflector being arranged to throw light rays from said source at diverging angles to the axis of the reflector, a relatively adjustable reflector projecting outwardly from the fixed reflector in close proximity thereto and being substantially a continuation of the surface of the fixed reflector but extending thereabout for only a portion of the periphery thereof, and a third reflector mounted outwardly of the adjustable reflector in close proximity thereto and being concentric with the fixed reflector and facing the same, In testimony whereof I affix my signature.

JOHN S. ADAMS.